US006970996B1

(12) United States Patent
Green

(10) Patent No.: US 6,970,996 B1
(45) Date of Patent: Nov. 29, 2005

(54) OPERAND QUEUE FOR USE IN A FLOATING POINT UNIT TO REDUCE READ-AFTER-WRITE LATENCY AND METHOD OF OPERATION

(75) Inventor: Daniel W. Green, Marlboro, MA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,093

(22) Filed: Jan. 4, 2000

(51) Int. Cl.[7] ............................. G06F 9/34; G06F 9/38; G06F 9/312
(52) U.S. Cl. ........................ 712/218; 712/201; 712/225
(58) Field of Search ................................ 712/225, 218, 712/201, 210, 222

(56) References Cited

U.S. PATENT DOCUMENTS 5,721,855 A * 2/1998 Hinton et al. ............... 712/217
5,987,593 A * 11/1999 Senter et al. ................ 712/206
6,021,485 A * 2/2000 Feiste et al. ................. 712/216
6,141,747 A * 10/2000 Witt ............................ 711/138

* cited by examiner

Primary Examiner—Eddie Chan
Assistant Examiner—Tonia L. Meonske

(57) ABSTRACT

A floating point unit includes floating point processing units for executing floating point instructions that write operands to an external memory and for executing floating point instructions that read operands from the external memory. The floating point also includes an operand queue for storing a plurality of operands associated with one or more operations being processed in the floating point unit. The operand queue stores a first operand written by a floating point write instruction executed by a first one of the plurality of floating point processing units and supplies the first operand to a floating point read instruction executed by a second one of the plurality of floating point processing units when the first operand is committed or virtually committed.

21 Claims, 5 Drawing Sheets

US 6,970,996 B1

OPERAND QUEUE FOR USE IN A FLOATING POINT UNIT TO REDUCE READ-AFTER-WRITE LATENCY AND METHOD OF OPERATION

TECHNICAL FIELD OF THE INVENTION

The present invention is directed, in general, to processing systems and, more specifically, to an operand queue for use in the floating point unit of a microprocessor.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in mathematical calculations, particularly floating point calculations. Some mathematical operations, such as multiplication and division, cause significant delays during program execution. A pipelined floating point unit (FPU) may be particularly susceptible to long delays during the execution of certain sequences of instructions. For example, a floating point "load" instruction may occur in a pipelined FPU immediately after, or shortly after, a floating point store instruction occurs. This is sometimes referred to as a "read-after-write" (RAW) hazard. The write (or store) operation to system memory may have a long latency before the write data is "committed" to system memory by the processor. The read (or load) operation following the write (or store) operation may occur before the write operation is complete and may, therefore, suffer significant delays waiting for the write operation to complete before the committed data may be read back from memory.

Therefore, there is a need in the art for an improved microprocessor that executes mathematical operations more rapidly. In particular, there is a need for an improved floating point unit that executes floating point operations as rapidly as possible. More particularly, there is a need in the art for a floating point unit that minimizes delays caused by writing data to memory.

SUMMARY OF THE INVENTION

The limitations inherent in the prior art described above are overcome by an improved floating point unit for use in a data processor. According to an advantageous embodiment of the present invention, the floating point unit comprises: 1) a plurality of floating point processing units capable of executing floating point instructions that write operands to an external memory and capable of executing floating point instructions that read operands from the external memory; and 2) an operand queue capable of storing a plurality of operands associated with one or more operations being processed in the floating point unit, wherein the operand queue stores a first operand being written to an external memory by a floating point write instruction executed by a first one of the plurality of floating point processing units and wherein the operand queue supplies the first operand to a floating point read instruction executed by a second one of the plurality of floating point processing units subsequent to the execution of the floating point write instruction.

In one embodiment of the present invention, the floating point unit further comprises a store conversion unit capable of converting operands in the plurality of floating point processing units from an internal format associated with the plurality of floating point processing units to an external format associated with the external memory.

In another embodiment of the present invention, the operand queue receives the first operand from the store conversion unit and transfers the first operand to the external memory.

In still another embodiment of the present invention, the floating point unit further comprises a load conversion unit capable of converting incoming operands received from the external memory from an external format associated with the external memory to an internal format associated with the plurality of floating point processing units.

In yet another embodiment of the present invention, the operand queue receives the incoming operands from the external memory and transfers the incoming operands to the load conversion unit.

In a further embodiment of the present invention, the data in the external memory is accessed in groups of N bytes and the floating point unit further comprises at least one aligner capable of receiving a first incoming operand that is misaligned with respect to a boundary between a first N byte group and a second N byte group and aligning the first incoming operand.

In a still further embodiment of the present invention, the operand queue receives the aligned first incoming operand from the at least one aligner.

In a yet further embodiment of the present invention, the at least one aligner sets at least one bit in the operand queue to indicate that the aligned first incoming operand is valid.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
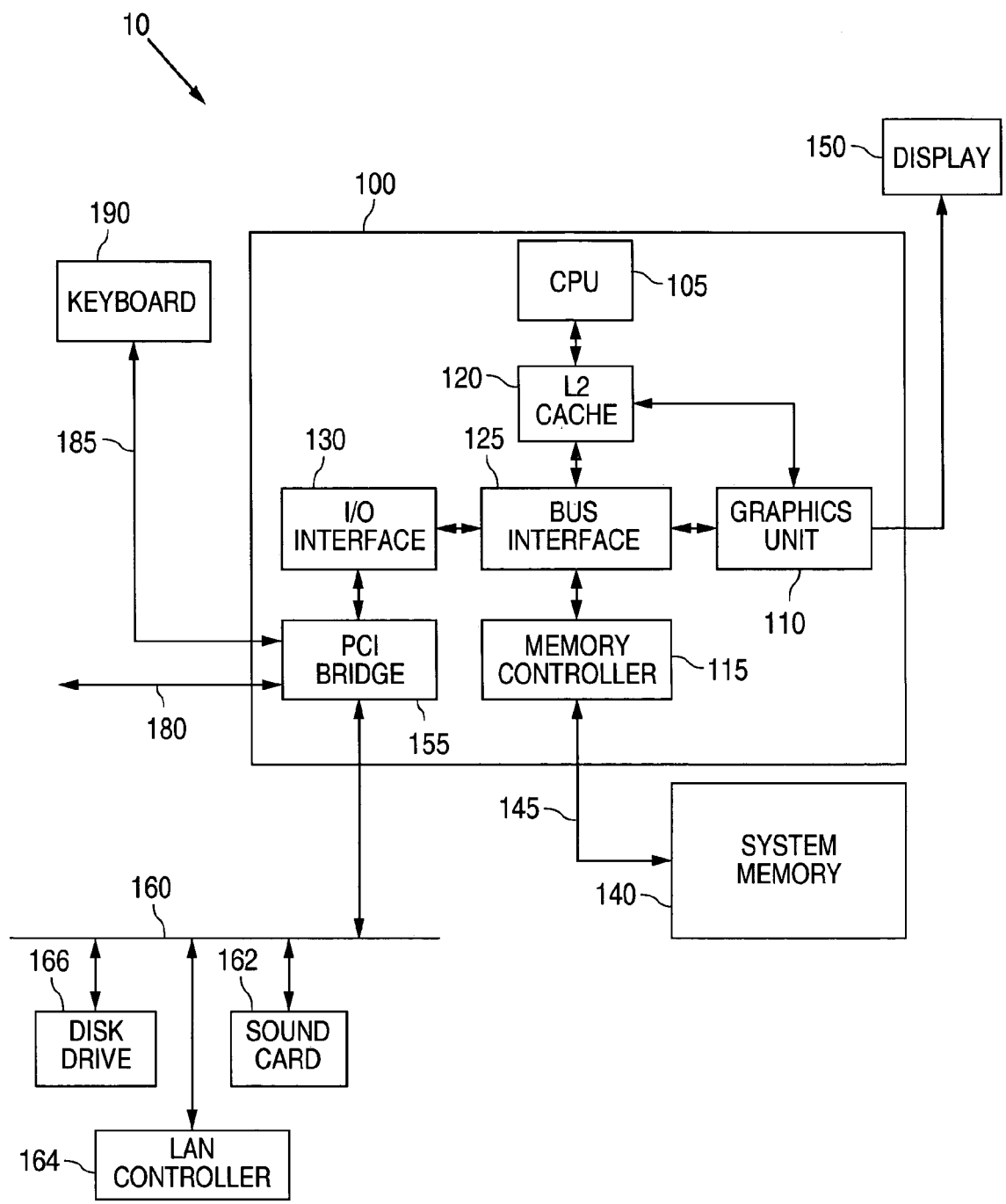
FIG. 1 is a block diagram of an exemplary processing system, which includes an integrated microprocessor according to one embodiment of the present invention.

FIG. 1 illustrates processing system 10, which includes integrated microprocessor 100, according to one embodiment of the present invention. Integrated microprocessor 100 comprises central processing unit (CPU) 105, which has dual integer and dual floating point execution units, separate load/store and branch units, and level one (L1) instruction and data caches. Microprocessor 100 also comprises graphics unit 110, system memory controller 115, and level two (L2) cache 120, which is shared by CPU 105 and graphics unit 110. Graphics unit 110, system memory controller 115, and L2 cache 120 may be integrated onto the same die as CPU 105. Bus interface unit 125 couples CPU 105, graphics unit 110, and L2 cache 120 to memory controller 115. Bus interface unit 125 also may be integrated onto the same die as CPU 105.

Integrated memory controller 115 bridges microprocessor 100 to system memory 140, and may provide data compression and/or decompression to reduce bus traffic over external memory bus 145 which preferably, although not exclusively, has a RAMbus™, fast synchronous dynamic random access memory (SDRAM) or other type protocol. Integrated graphics unit 110 provides thin film transistor (TFT), DSTN, red-green-blue (RGB), and other types of video output to drive display 150.

Bus interface unit 125 connects microprocessor 100 through input/output (I/O) interface 130 to PCI bridge 155, which has a conventional peripheral component interconnect (PCI) bus interface on PCI bus 160 to one or more peripherals, such as sound card 162, local area network (LAN) controller 164, and disk drive 166, among others. Bus interface unit 125 also connects fast serial link 180 and relatively slow I/O port 185 to microprocessor 100 (via I/O interface 130 and PCI bridge 155). Fast serial link 180 may be, for example, an IEEE 1394 bus (i.e., "Firewire") and/or a universal serial bus ("USB"). I/O port 185 is used to connect peripherals to microprocessor 100, such as keyboard 190 and/or a mouse. In some embodiments, PCI bridge 155 may integrate local bus functions such as sound, disk drive control, modem, network adapter, and the like.

Figure 2:
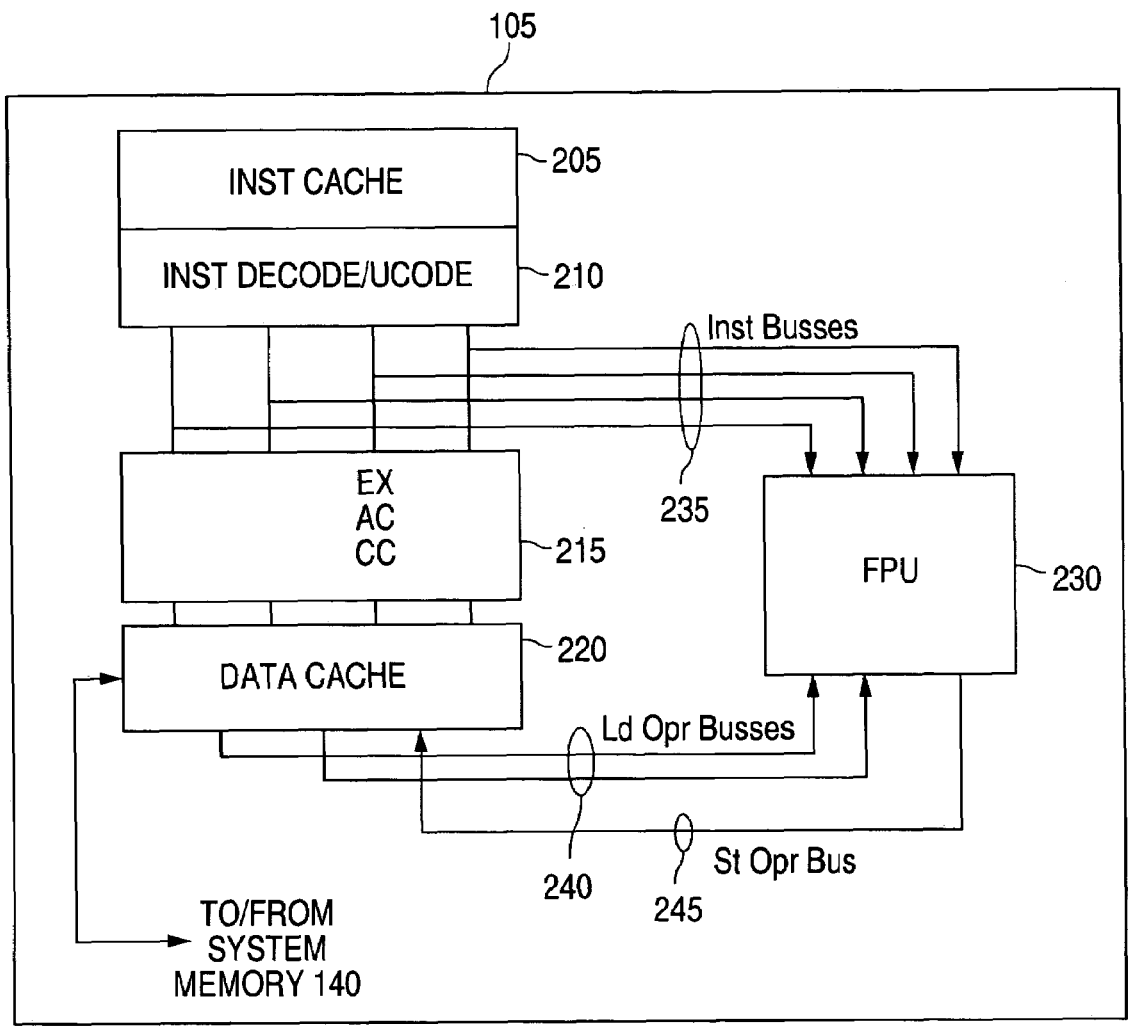
FIG. 2 illustrates selected portions of the exemplary CPU in greater detail according to one embodiment of the present invention.

FIG. 2 illustrates selected portions of CPU 105 in greater detail according to one embodiment of the present invention. CPU 105 comprises instruction cache 205, instruction decode/microcode (Ucode) logic 210, integer unit 215, data cache 220, and floating point unit (FPU) 230. FPU 230 is connected to the rest of CPU 105 via four sets of instruction buses 235, two load operand buses 240, and a store operand bus 245. Execution pipelines 215 comprises one or more integer execution (EX) units, address calculation (AC) units, and condition code (CC) units, which are used to set flags in CPU 105.

FPU 230 is an execution unit in the same way that the EX and AC units in execution pipelines 215 are execution units. In one embodiment of the present invention, when an instruction is decoded in instruction decode/Ucode logic 210, it may be broken down into up to, for example, five (5) nodes (or operations). Three of the nodes are EX, AC and CC nodes used by integer unit 215. The other two nodes are floating point nodes: an Add/Multiply/Store node and a load node. If the instruction is an integer instruction that does not use FPU 230, instruction decode/Ucode logic 210 may issue "no-ops" to both nodes. If the instruction is a floating point instruction that uses FPU 230, then two nodes (operations) can be issued.

FPU 230 receives data operands on load (read) operations from data cache 220 over two load operand buses 240. Loaded data from data cache 220 is sent to FPU 230 in the same alignment format as the loaded data is stored system memory 140. As will be explained below in greater detail, if the load data crosses a line boundary, the load data is sent in two pieces and is aligned prior to being placed in FPU 230 in an operand queue in accordance with the principles of the present invention. Data cache 220 does not guarantee the order or sequentiality of data transfers for parts of a load operation. FPU 230 is responsible for assembling and aligning the load data.

In the exemplary embodiment, FPU 230 uses two load buses because the frequency of load operations is twice the frequency of floating point operations. Therefore, in order to achieve an execution rate of one floating point operation per clock, FPU 230 uses two load buses 240. FPU 230 uses one store bus 245 to store results to system memory 140 at commit time. Unlike load operations, where the memory alignment is done in FPU 230, rotating data to put it in memory format is done in data cache 220. The reason for one store bus is that store operations only comprise between 5% and 15% of all floating point instructions, so one bus is sufficient for bandwidth purposes.

FPU 230 also contains a write buffer (explained below in greater detail) which allows nodes (operations) with multiple stores in them to be committed to system memory 140 in one cycle. The write buffer contains only the data portion of a floating point store operation.

Figure 3:
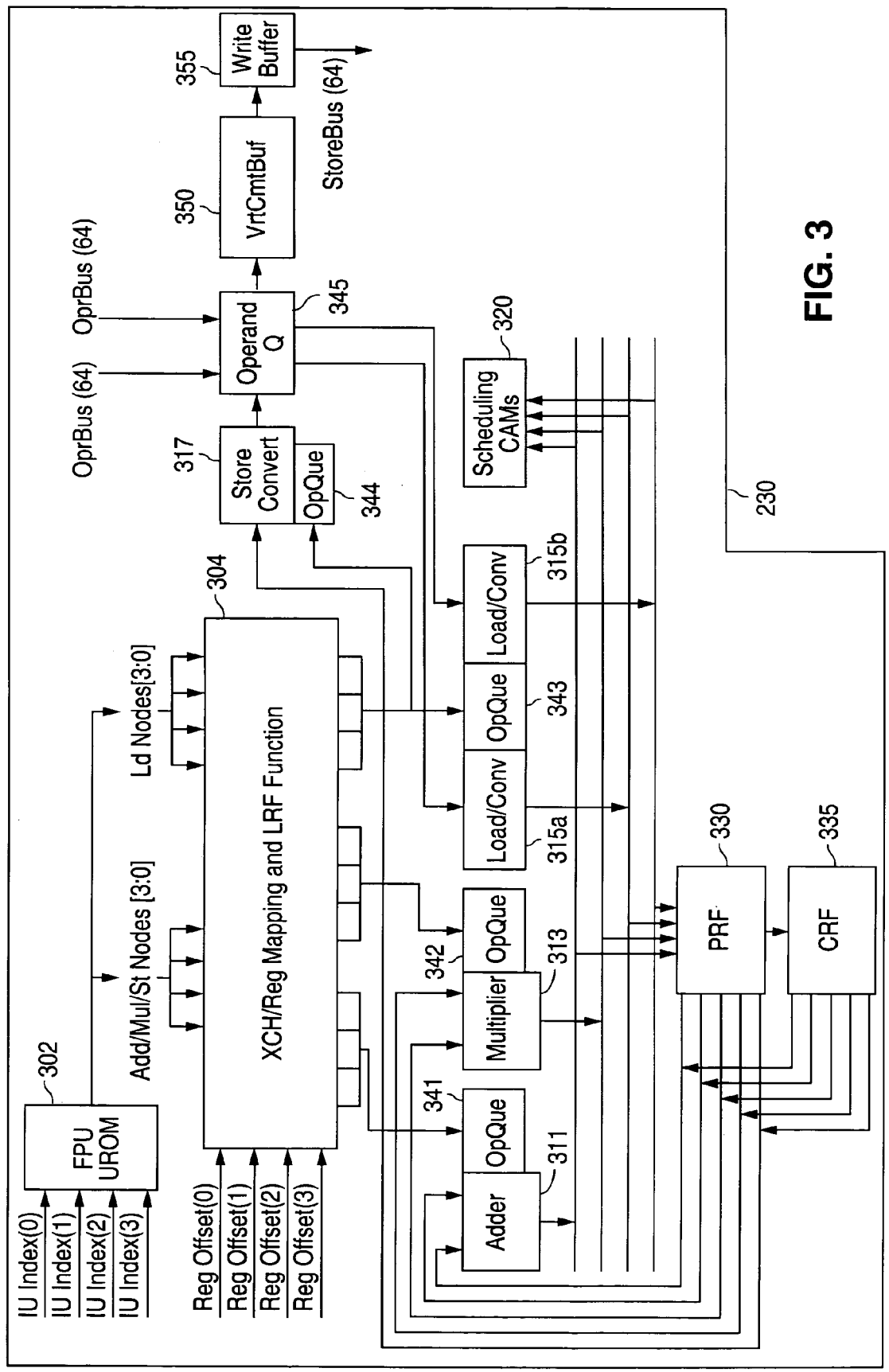
FIG. 3 illustrates selected portions of the exemplary floating point unit in greater detail according to one embodiment of the present invention.

FIG. 3 illustrates selected portions of floating point unit 230 in greater detail according to one embodiment of the present invention. Floating point unit (FPU) 230 comprises FPU micro-ROM-(UROM) 302, node exchange (XCH)/ register mapping logic and logical-to-physical register file (LRF) logic 304, adder 311, multiplier 313, load conversion units 315a and 315b, and scheduling content addressable memory (CAM) devices 320. FPU 230 also comprises opcode queues 341, 342, and 343, which are associated with adder 311, multiplier 313, and load converter units 315a and 315b, respectively. FPU 230 further comprises store converter unit 317, opcode queue 344, and operand queue 345 according to the principles of the present invention. Finally, FPU 230 comprises virtual commit buffer 350 and write buffer 355.

FPU 230 receives opcodes (instructions) from instruction decoder/Ucode logic 210. Since the number of bits required to control FPU 230 maybe quite large, instruction decoder/Ucode logic 210 does not send FPU 230 a micro-word. Instead, instruction decoder/Ucode logic 210 sends index values to FPU micro-ROM (UROM) 302. The index values are represented by the inputs instruction/microcode (IU) index (0) to instruction/microcode (IU) index (3). UROM 302 outputs consists of an add/multiply operation and a load store operation that are applied to node exchange (XCH)/register mapping logic and logical-to-physical register file logic 304. XCH/Reg & Mapping and LRF logic 304 computes the physical source and destination addresses in system memory 140 of an operand for each instruction in system memory 140 using register offset values represented by inputs register offset (0) through register offset (3).

Once re-mapped register addresses are formed, the data dependencies between nodes are resolved. This operation involves reading the LRF, which delivers an address for the physical register. The physical location of the data may be one of three places. The data may be in committed register file (CRF) 335, in which case the CRF register number and a bit which indicates resident data in the CRF is returned. The CRF holds the committed state of the architectural registers of CPU 105. The data could also be in physical register file (PRF) 330 (also known as a reorder buffer) if the data has been computed but not committed yet. In this case, the PRF location and PRF present values are returned for the operand.

Finally, the data may not have been computed yet. In this final case, the dependent instruction is marked as pending and the PRF location where the data will be deposited is returned. The dependent instruction then monitors the result busses and when the result is produced, PRF 330 is read to obtain the data. Once the operation and physical locations of the operands have been generated, the opcodes are loaded into opcode queues 341–344 associated with each functional unit and into a content addressable memory (CAM) which controls the operand valid bits.

There are four major functional units in FPU 230. Adder 311 and multiplier 313 perform the majority of the arithmetic. These operations are fully pipelined and have a latency of three clock cycles and a throughput of one clock cycle. FPU 230 uses two load conversion units 315a and 315b to convert load data from a format stored in system memory 140 to the internal format of FPU 230. Load conversion units 315a and 315b receive operands only from operand queue 345. When all pieces of load data in operand queue 345 are valid, one of load conversion units 315a and 315b is scheduled to convert the load data. The opcode in opcode queue 343 indicates how wide the load data is and what format conversion the load data requires.

There is one store conversion unit 317 in FPU 230. Store conversion unit gets its operands from physical register file (PRF) 330 or committed register file (CRF) 335 or by bypassing a result bus. PRF holds temporary results or uncommitted instructions. The format of store data is converted by store conversion unit 317 from the internal format of FPU 230 to the format of system memory 140 and the converted store data is stored in operand queue 345. Operand queue 345 contains an entry for every operation in FPU 230. When a store (write) instruction is to be committed to system memory 140, the store data is read from operand queue 345 and is written to virtual commit buffer 350. The read operations from operand queue 345 are sequential and as the store data is transferred to virtual commit buffer 350, the store data is also written into any dependent load instructions (i.e. read-after-write hazards) in operand queue 345. Once an instruction may be committed, FPU 230 transfers the store data from virtual commit buffer 350 to write buffer 355.

Figure 4:
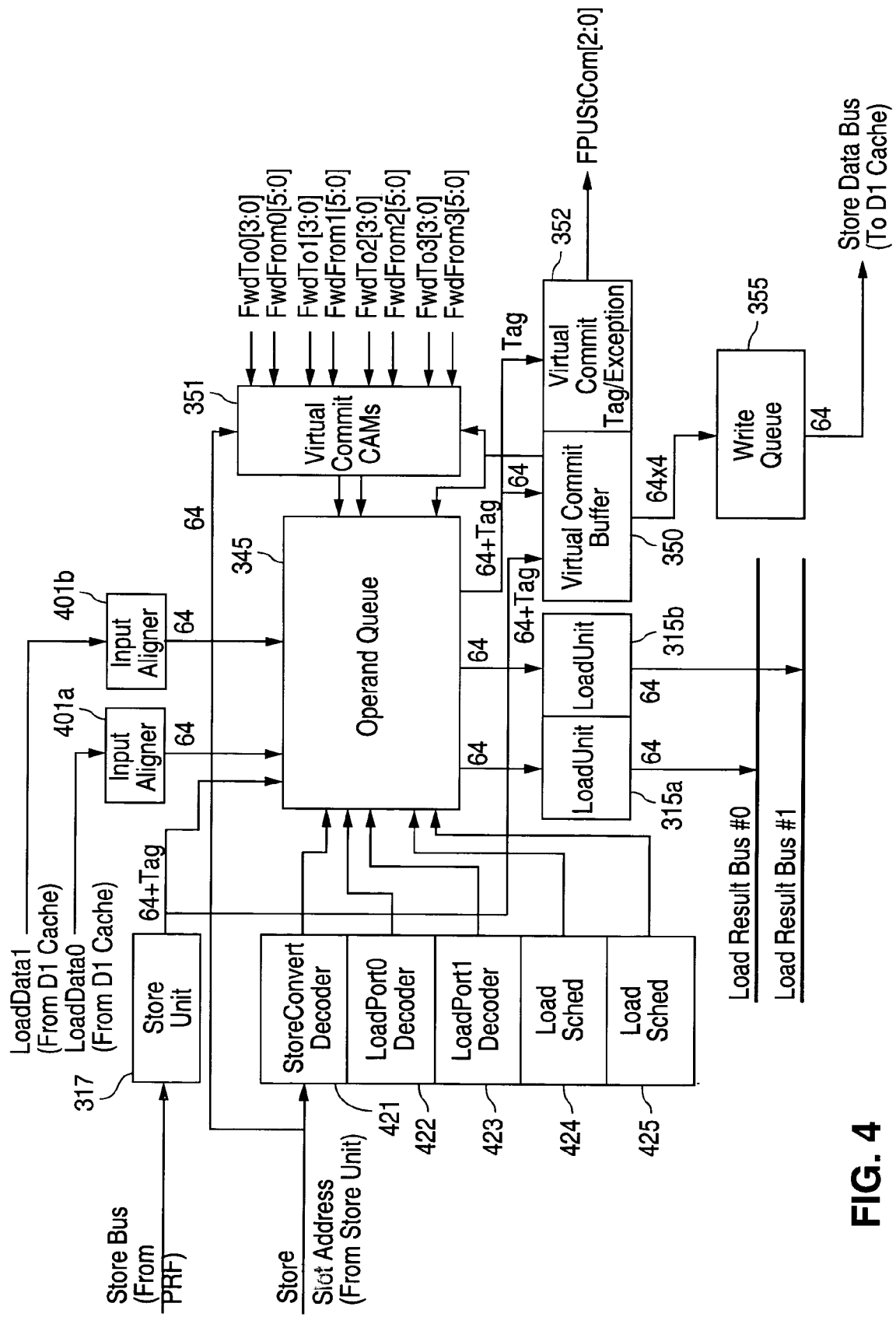
FIG. 4 illustrates the exemplary operand queue and related portions of the exemplary floating point unit in greater detail according to one embodiment of the present invention.

FIG. 4 illustrates exemplary operand queue 345 and related portions of exemplary floating point unit 230 in greater detail according to one embodiment of the present invention. Operand queue 345 receives load data from data cache 220 via input aligner 401a and input aligner 401b. If an FPU instruction loads (reads) data from memory that is not aligned on system memory boundaries, the data is read in two parts and is aligned by input aligner 401a and input aligner 401b.

For example, if system memory 140 is aligned on eight byte boundaries, then the instruction "Load address 2" would read eight (8) bytes of data from address 2 through address 9. To perform this load operation, the eight bytes from address 0 through address 7 (low portion) would be loaded into, for example, input aligner 401a from most significant byte to least significant byte as follows: 7,6,5,4, 3,2,1,0. Input aligner 401a would then rotate the load data by two bytes to the following order: 1,0,7,6,5,4,3,2. Next, bytes 2 through 7 would be transferred to operand queue 345 and the Valid Low bit would be set to Logic 1. The eight bytes from address 8 through address 15 (high portion) would be loaded into input aligner 401b from most significant byte to least significant byte as follows: 15,14,13,12,11,10,9,8. Input aligner 401a would then rotate the load data by two bytes to the following order: 9,8,15,14,13,12,11,10. Next, byte 8 and byte 9 would be transferred to operand queue 345 and the Valid High bit would be set to Logic 1. Operand queue 345 would now contain bytes 9,8,7,6,5,4,3,2 and the Valid High bit and Valid Low bit would both be valid. Only at this time may operand queue 345 be used as a source of load data. It is noted that the order that the data arrives from memory can be reversed and the operand queue will still function properly. If the high portion is delivered to the operand queue first, then bytes 9 and 8 are written into the operand queue and the Valid High flag is set. The operand will not be considered to be valid yet because the low portion has not been received from memory. Thus, operand queue 345 will wait for the remaining data. When the low portion arrives from memory, bytes 7,6,5,3,2 will be written into operand queue 345 and the Valid Low flag will be set. Once both flags (or valid bits) are set, operand queue 345 will be considered valid and the load operation can proceed.

Virtual commit buffer 350 further comprises forwarding array 351 of content addressable memory (CAM) locations, and virtual commit tag/exception register 352. Forwarding array 351 is indexed by "forward to" addresses and "forward from" addresses and holds instruction numbers. Operand queue 345 holds data associated with particular instruction numbers. When store (write) instructions are executed by FPU 230, the store data may be converted by store conversion unit 317 and placed in operand queue 345. If the slot that the store data is destined to is virtually committed, the store data may bypass operand queue 345 and be written directly into virtual commit buffer 350.

Before a checkpoint can commit, each store instruction on the checkpoint is read sequentially and is placed into virtual commit buffer 350. As the store data are read, they are written back into any dependent load operations in forwarding array 351. Operand queue 345 may have data written into it via store converter decoder 421, load port decoder 422, and load port decoder 423. Data may be read from operand queue 345 by load scheduler 424 and load scheduler 425. When a checkpoint is finally committed, the store data are transferred from four locations at a time in virtual commit buffer 350 to write buffer 355. Data are transferred from write buffer 355 to data cache 220 under control of data cache 220.

As used herein, "virtual commit" is the process of transferring store data from operand queue 345 into virtual commit buffer 350, as well as storing virtually committed data into any dependent load slots in operand queue 345. The process of virtual commit is performed on a slot-by-slot basis in operand queue 345 and virtual commit buffer 350. However, a virtual commit cycle is only required if a slot has a floating-point store in it. Checkpoints that do not have any floating-point stores also require 1 cycle to virtually commit.

If there is a floating-point store in a slot of a checkpoint, data from the checkpoint is read from operand queue 345 and is registered in the CAM registers of store forwarding array 351, as well as written into that slot's position in virtual commit buffer 350. The virtual commit pointer is then advanced to the next floating-point store. If that store operation is valid in operand queue 345, the data from that slot will be transferred from operand queue 345 into virtual commit buffer 350. Once all stores have been transferred to virtual commit buffer 350, FPU 230 asserts a signal, FPUStoreCommitOK, and also asserts exception status for the commit level. When the commit unit indicates that the checkpoint should be committed, the data is transferred from virtual commit buffer 350 to write queue 355.

The virtual commit pointer is advanced as quickly as it can be through the slots in virtual commit buffer 350. This means that the virtual commit pointer does not wait for a store to complete for it to advance. Instead, as soon as a checkpoint has been issued to the load/store unit, the virtual commit pointer pulls all stores from operand queue 345 and forwards data from the store operation to any dependent read operation. The virtual commit pointer only stops after all stores for the three virtual commit checkpoints have been read.

When a store occurs, the store data is written into operand queue 345 at the address indexed by the store slot:checkpoint value and the CAMs in forwarding array 351 compare the store address with all "forward from" addresses so that all dependent reads will be updated as well. The CAM outputs are used as word lines for operand queue 345 and are also used to mark the dependent reads as needing re-execution. Store operations also write into virtual commit buffer 350 at the proper slot:checkpoint value, so that it is not necessary to back up the virtual commit pointer to the slot:checkpoint value where the store occurred.

If a store forwarding request is set up with a virtually committed source, the virtual commit pointer is backed up to the offending slot. This allows the forwarded data to be read from operand queue 345 and to be written into the forwarded slot. It is not necessary to check destinations of store forwards since the "from" address must be less than the "to" address.

The virtual commit tag/exception unit 352 accumulates tags from the stores that have been virtually committed. The tags are only accumulated for the current checkpoint and are reset at the beginning of a checkpoint. The PRF commit logic uses the OR of all exception bits in these tags to determine if there is a pending exception that should be marked in the status register or should cause a commit fail.

Figure 5:
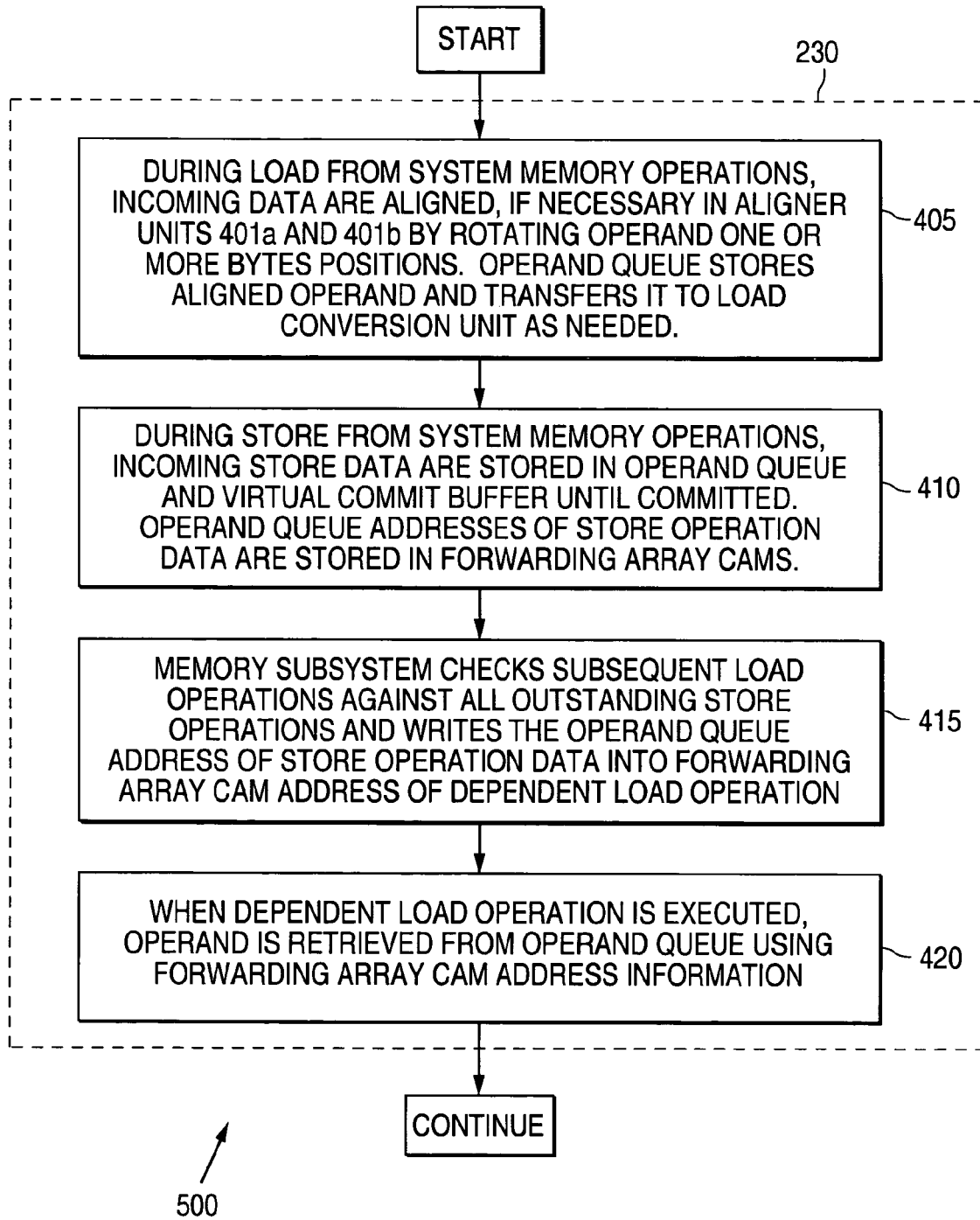
FIG. 5 is a flow chart illustrating the operation of a floating point unit containing an operand queue according to one embodiment of the present invention.

FIG. 5 depicts flow chart 500, which illustrates the operation of floating point unit (FPU) 230 containing operand queue 345 according to one embodiment of the present invention. During a load operation in which an operand data is retrieved from system memory 140 (i.e., from data cache 220), the incoming operand data are aligned, if necessary, in aligner units 401a and 401b. When the Valid High and Valid Low bits are both set for that operand queue entry, the operand is available for transfer to load conversion units 315a and 315b (process step 405).

During a store operation in which operand data are to be sent to system memory 140, the store data are stored and held in operand queue 345 and in virtual commit buffer 350 until the store data instruction is finally committed. The operand queue address of the store operation instruction is stored in the CAM portion of forwarding array 351 in virtual commit buffer 350 (process step 410). The memory subsystem checks all subsequent load operations in FPU 230 against outstanding store operations in forwarding array 351 to determine if any of the subsequent load operations are dependent on the data operand associated with the outstanding store operation. If a subsequent load operation is dependent on the store data operation, then the address in operand queue 345 that holds the operand of the store operation is also written into forwarding array 351 at the address of the dependent load operation (process step 415). When the dependent load operation is subsequently executed, the address of the dependent load instruction is used as an index into forwarding array 351 to retrieve the address in operand queue 345 of the needed data (process step 420).

By way of example, suppose that FPU 230 holds sixteen operations. Operand queue 345 and virtual commit buffer 350 then each contain sixteen entries, one for each entry in pipelined FPU 230. The fifth instruction, I5, in FPU 230 is the operation "store address 2 from store conversion unit 317." The tenth instruction, I10, in FPU 230 is the operation "load address 2 to store conversion unit 315a." Instruction I10 (at address 10) is dependent on the data from previous instruction I5 (at address 5). The memory subsystem detects the dependent load and causes FPU 230 to write the address value "5" into forwarding array 351 in two places: at address 5 and at address 10. The operand data associated with the store address operation is written into operand queue 345 at address 5 and at address 10. Now when instruction I10 is executed, the dependent load operation will be satisfied using the operand data from location 10 in operand queue 345. It is not necessary for the data to be retrieved from address 2 in system memory 140. Thus, the latency associated with a read-after-write (RAW) hazard is avoided, since it is no longer necessary to wait for the write operation to be completed to system memory 140.

Although the present invention has been described in detail, those skilled in the art should understand that they can make various changes, substitutions and alterations herein without departing from the spirit and scope of the invention in its broadest form.

What is claimed is:

1. For use in a data processor, a floating point unit comprising:

a buffer capable of storing operands and comprising a forwarding array of addressable memory locations;

a plurality of floating point processing units capable of executing floating point instructions that write operands to an external memory and capable of executing floating point instructions that read operands from said external memory; and an operand queue capable of storing a plurality of operands associated with one or more operations being processed in said floating point unit, wherein said operand queue stores a first operand written by a floating point write instruction executed by a first one of said plurality of floating point processing units and wherein said operand queue supplies said first operand to a floating point read instruction executed by a second one of said plurality of floating point processing units when said floating point read instruction requires said first operand;

wherein said first operand is virtually committed by writing the first operand from said operand queue to the buffer and by writing an operand queue address of the first operand into the memory location in the forwarding array that is associated with the floating point write instruction;

wherein said first operand is supplied to the floating point read instruction by writing the operand queue address of the first operand into the memory location in the forwarding array that is associated with the floating point read instruction, the operand queue address in the memory location associated with the floating point read instruction used to retrieve the first operand from the operand queue; and wherein a second operand is written directly to the buffer bypassing the operand queue in response to a slot in the operand queue, where the second operand was to be stored, already being virtually committed.

2. The floating point unit as set forth in claim 1 wherein said floating point unit further comprises a store conversion unit capable of converting operands in said plurality of floating point processing units from an internal format associated with said plurality of floating point processing units to an external format associated with the external memory.

3. The floating point unit as set forth in claim 2 wherein said operand queue receives said first operand from said store conversion unit and transfers said first operand to said buffer for storage in said external memory.

4. The floating point unit as set forth in claim 1 wherein said floating point unit further comprises a load conversion unit capable of converting incoming operands received from said external memory from an external format associated with an external memory to an internal format associated with said plurality of floating point processing units.

5. The floating point unit as set forth in claim 4 wherein said operand queue receives said incoming operands from said external memory and transfers said incoming operands to said load conversion unit.

6. The floating point unit as set forth in claim 5 wherein data in said external memory is accessed in groups of N bytes and wherein said floating point unit further comprises at least one aligner capable of receiving a first incoming operand that is misaligned with respect to a boundary between a first N byte group and a second N byte group and aligning said first incoming operand.

7. The floating point unit as set forth in claim 6 wherein said operand queue receives said aligned first incoming operand from said at least one aligner.

8. The floating point unit as set forth in claim 7 wherein said at least one aligner sets at least one bit in said operand queue to indicate that said aligned first incoming operand is valid.

9. A data processor comprising:
   at least one pipelined integer execution unit;
   a data cache;
   an instruction cache; and
   a floating point unit comprising:
      a buffer capable of storing operands and comprising a forwarding array of addressable memory locations;
      a plurality of floating point processing units capable of executing floating point instructions that write operands to an external memory and capable of executing floating point instructions that read operands from said external memory; and
      an operand queue capable of storing a plurality of operands associated with one or more operations being processed in said floating point unit, wherein said operand queue stores a first operand written by a floating point write instruction executed by a first one of said plurality of floating point processing units and wherein said operand queue supplies said first operand to a floating point read instruction executed by a second one of said plurality of floating point processing units when said floating point read instruction requires said first operand;
   wherein said first operand is virtually committed by writing the first operand from said operand queue to the buffer and by writing an operand queue address of the first operand into the memory location in the forwarding array that is associated with the floating point write instruction;
   wherein said first operand is supplied to the floating point read instruction by writing the operand queue address of the first operand into the memory location in the forwarding array that is associated with the floating point read instruction, the operand queue address in the memory location associated with the floating point read instruction used to retrieve the first operand from the operand queue; and
   wherein a second operand is written directly to the buffer bypassing the operand queue in response to a slot in the operand queue, where the second operand was to be stored, already being virtually committed.

10. The data processor as set forth in claim 9 wherein said floating point unit further comprises a store conversion unit capable of converting operands in said plurality of floating point processing units from an internal format associated with said plurality of floating point processing units to an external format associated with the external memory.

11. The data processor as set forth in claim 10 wherein said operand queue receives said first operand from said store conversion unit and transfers said first operand to said buffer for storage in said external memory.

12. The data processor as set forth in claim 9 wherein said floating point unit further comprises a load conversion unit capable of converting incoming operands received from said external memory from an external format associated with an external memory to an internal format associated with said plurality of floating point processing units.

13. The data processor as set forth in claim 12 wherein said operand queue receives said incoming operands from said external memory and transfers said incoming operands to said load conversion unit.

14. The data processor as set forth in claim 13 wherein data in said external memory is accessed in groups of N bytes and wherein said floating point unit further comprises at least one aligner capable of receiving a first incoming operand that is misaligned with respect to a boundary between a first N byte group and a second N byte group and aligning said first incoming operand.

15. The data processor as set forth in claim 14 wherein said operand queue receives said aligned first incoming operand from said at least one aligner.

16. The data processor as set forth in claim 15 wherein said at least one aligner sets at least one bit in said operand queue to indicate that said aligned first incoming operand is valid.

17. For use in a floating point unit comprising a plurality of floating point processing units capable of executing floating point instructions that write operands to an external memory and capable of executing floating point instructions that read operands from the external memory, a method of accessing the operands comprising:

storing in an operand queue a first operand written by a floating point write instruction executed by a first one of the plurality of floating point processing units;

supplying the first operand from the operand queue to a floating point read instruction executed by a second one of the plurality of floating point processing units when the floating point read instruction requires the first operand, wherein the first operand is supplied to the floating point read instruction by writing an operand queue address of the first operand into a memory location in a forwarding array that is associated with the floating point read instruction, the operand queue address in the memory location associated with the floating point read instruction used to retrieve the first operand from the operand queue;

virtually committing the first operand by writing the first operand from the operand queue to a buffer and by writing the operand queue address of the first operand into a memory location in the forwarding array that is associated with the floating point write instruction; and writing a second operand directly to the buffer bypassing the operand queue in response to a slot in the operand queue, where the second operand was to be stored, already being virtually committed.

18. The method as set forth in claim 17 wherein the floating point unit further comprises a store conversion unit capable of converting operands in the plurality of floating point processing units from an internal format associated with the plurality of floating point processing units to an external format associated with the external memory.

19. The method as set forth in claim 18 further including:

storing the first operand from the store conversion unit into the operand queue.

20. The method as set forth in claim 17 wherein the floating point unit further comprises a load conversion unit capable of converting incoming operands received from an external memory from an external format associated with the external memory to an internal format associated with the plurality of floating point processing units.

21. The method as set forth in claim 20 further including:

storing the incoming operands from the external memory in the operand queue; and transferring the incoming operands from the operand queue to the load conversion unit.

* * * * *

UNITED STATES PATENT AND TRADEMARK OFFICE
CERTIFICATE OF CORRECTION

PATENT NO. : 6,970,996 B1  
APPLICATION NO. : 09/477093  
DATED : November 29, 2005  
INVENTOR(S) : Daniel Green Page 1 of 1

It is certified that error appears in the above-identified patent and that said Letters Patent is hereby corrected as shown below:

Column 8, line 43, delete "110" and replace with --I10--  
Column 8, line 45, delete "110" and replace with --I10--

Signed and Sealed this

Eighth Day of August, 2006

JON W. DUDAS  
*Director of the United States Patent and Trademark Office*